US010330234B1

(12) United States Patent
Geschwender (10) Patent No.: US 10,330,234 B1
(45) Date of Patent: Jun. 25, 2019

(54) PERISTALTIC PULSE DAMPENER

(71) Applicant: Robert C. Geschwender, Lincoln, NE (US)

(72) Inventor: Robert C. Geschwender, Lincoln, NE (US)

(73) Assignees: Robert C. Geschwender, Lincoln, NE (US); Donna J. Geschwender, Lincoln, NE (US)

( * ) Notice: Subject to any disclaimer, the term of this patent is extended or adjusted under 35 U.S.C. 154(b) by 0 days.

(21) Appl. No.: 15/982,824

(22) Filed: May 17, 2018

(51) Int. Cl.
*F16L 55/04* (2006.01)
*F04B 43/02* (2006.01)
*F04B 11/00* (2006.01)

(52) U.S. Cl.
CPC ............ *F16L 55/041* (2013.01); *F04B 11/00* (2013.01); *F04B 11/0008* (2013.01); *F04B 43/023* (2013.01)

(58) Field of Classification Search
CPC .... F04B 11/00; F04B 11/0008; F04B 43/023; F16L 55/041
USPC ............................................................ 92/96
See application file for complete search history.

(56) References Cited

U.S. PATENT DOCUMENTS

| | | | | |
|---|---|---|---|---|
| 2,474,512 A * | 6/1949 | Stephens | ............... | F16L 55/052 100/170 |
| 2,736,332 A * | 2/1956 | Simmons | ................. | F15B 7/10 137/100 |
| 3,804,107 A * | 4/1974 | Kozlov | ............... | A61M 1/1656 137/101.31 |
| 4,599,165 A * | 7/1986 | Chevallet | ................ | A61M 1/30 210/257.2 |
| 4,662,829 A * | 5/1987 | Nehring | .................. | F04B 43/06 417/395 |
| 6,837,693 B2 * | 1/2005 | Welch | ................. | F04B 11/0016 417/540 |
| 8,366,420 B1 * | 2/2013 | Geschwender | ....... | F04B 43/086 417/475 |
| 2006/0129099 A1 * | 6/2006 | Kumar | ................ | A61M 3/0258 604/151 |
| 2011/0196303 A1 * | 8/2011 | Chan | ................. | A61M 5/14212 604/151 |
| 2013/0098456 A1 * | 4/2013 | Charlton | ................. | F04B 11/00 137/1 |
| 2015/0306293 A1 * | 10/2015 | Sternby | ............... | A61M 1/1605 604/4.01 |
| 2016/0201836 A1 * | 7/2016 | Futatsugi | .............. | F16L 55/033 181/233 |

* cited by examiner

*Primary Examiner* — Thomas E Lazo
*Assistant Examiner* — Richard C Drake
(74) *Attorney, Agent, or Firm* — Suiter Swantz pc llo (57) ABSTRACT

A peristaltic pump dampener apparatus includes a first chamber and a second chamber separated by a flexible diaphragm. The first chamber of the peristaltic pulse dampener apparatus receives a first input flow tangent to the walls of the first chamber, and the second chamber of the peristaltic pulse dampener apparatus receives a second input flow tangent to the walls of the second chamber. The flexible diaphragm of the peristaltic pulse dampener apparatus acts to equalize the pressure between the first chamber and the second chamber so as to generate two substantially even, constant output flows.

18 Claims, 9 Drawing Sheets

PERISTALTIC PULSE DAMPENER

TECHNICAL FIELD

The present invention generally relates to the field of peristaltic pumps and, more particularly, to a peristaltic pump pulse dampener.

BACKGROUND

Peristaltic pumps are a type of pump which utilize a flexible tubing and a series of pressure plates, rollers, or cams, within a pump housing in order to pump liquids and/or slurries. In operation, the pressure plates sequentially occlude (e.g., pinch, compress) the flexible tubing (e.g., against the walls of the pump housing, against a second pressure plate, against one or more platens, and the like), thereby peristaltically forcing fluid through the flexible tubing. This systematic compression and decompression of the flexible tubing creates the driving force to move fluids throughout the tube, and results in a characteristic pulsating pumping pattern, often referred to as a "sinusoidal" pumping pattern.

Due to the fact that the fluid within a flexible tubing need not come into contact with any pumping elements aside from the flexible tube itself, peristaltic pumps are particularly useful for sterile fluids when minimizing contamination is of the utmost importance. Furthermore, the absence of exposed pump components in peristaltic pumps makes them especially useful when pumping caustic, abrasive, and hazardous fluids, such as fertilizers and pesticides. However, due to the pulsating nature of peristaltic pumps, the sinusoidal pumping pattern makes peristaltic pumps ill-suited in situations which require a constant pump flow. Current peristaltic pumps have been unable to produce a constant pump flow. Additionally, current methods and systems have proven to be unable to completely smooth the sinusoidal pumping pattern of peristaltic pumps.

Therefore, it would be advantageous to provide a system and method that cures one or more of the shortcomings described above.

SUMMARY

A peristaltic damping apparatus is disclosed, in accordance with one or more embodiments of the present disclosure. In one embodiment, the apparatus includes a chamber assembly (e.g., body), wherein the chamber assembly defines an open cavity. In another embodiment, the apparatus includes a flexible diaphragm disposed within the chamber assembly, wherein the flexible diaphragm divides the open cavity into a first chamber and a second chamber. In another embodiment, the apparatus includes a first input line configured to receive a first input flow and direct the first input flow into the first chamber. In another embodiment, the apparatus includes a first output line configured to receive a first output flow and direct the first output flow out of the first chamber. In another embodiment, the apparatus includes a second input line configured to receive a second input flow and direct the second input flow into the second chamber. In another embodiment, the apparatus includes a second output line configured to receive a second output flow and direct the second output flow out of the second chamber. In another embodiment, the first input flow and the second input flow exhibit sinusoidal pumping patterns which are out of phase with one another.

A method is disclosed, in accordance with one or more embodiments of the present disclosure. In one embodiment, the method includes providing a peristaltic pulse dampener apparatus, wherein the apparatus includes a first chamber and a second chamber separated by a flexible diaphragm. In another embodiment, the method includes inputting a first peristaltic pump flow with a first sinusoidal pumping pattern into the first chamber of the peristaltic pulse dampener apparatus. In another embodiment, the method includes inputting a second peristaltic pump flow with a second sinusoidal pumping pattern into the second chamber of the peristaltic pulse dampener apparatus, wherein the first sinusoidal pumping pattern and the second sinusoidal pumping pattern are out of phase with one another. In another embodiment, the method includes outputting a first output flow from the first chamber. In another embodiment, the method includes outputting a second output flow from the second chamber.

A system is disclosed, in accordance with one or more embodiments of the present disclosure. In one embodiment, the system includes a peristaltic pump. In another embodiment, the system includes a chamber assembly (e.g., body), wherein the chamber assembly defines an open cavity. In another embodiment, the system includes a flexible diaphragm disposed within the chamber assembly, wherein the flexible diaphragm divides the open cavity into a first chamber and a second chamber. In another embodiment, the system includes a first input line configured to receive a first input flow and direct the first input flow into the first chamber. In another embodiment, the system includes a first output line configured to receive a first output flow and direct the first output flow out of the first chamber. In another embodiment, the system includes a second input line configured to receive a second input flow and direct the second input flow into the second chamber. In another embodiment, the system includes a second output line configured to receive a second output flow and direct the second output flow out of the second chamber. In another embodiment, the first input flow and the second input flow exhibit sinusoidal pumping patterns which are out of phase with one another.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

The following description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and, together with the general description, serve to explain the principles of the invention.

Reference will now be made in detail to the subject matter disclosed, which is illustrated in the accompanying drawings.

Referring generally to FIGS. 1A-5B, a peristaltic pulse dampener apparatus is described, in accordance with one or more embodiments of the present disclosure.

Embodiments of the present disclosure are directed to a peristaltic pulse dampener apparatus, where the peristaltic pulse dampener apparatus receives two sinusoidal input flows and utilizes a flexible diaphragm in order to dampen the sinusoidal pattern of the input flows to generate substantially even, uniform output flows. Embodiments of the present disclosure are also directed to a peristaltic pump system, where the system includes a peristaltic pump and a peristaltic pump dampener apparatus. Embodiments of the present disclosure are also directed to methods of dampening the sinusoidal pumping patterns of peristaltic pumps via a peristaltic pulse dampener apparatus.

Figure 1A:
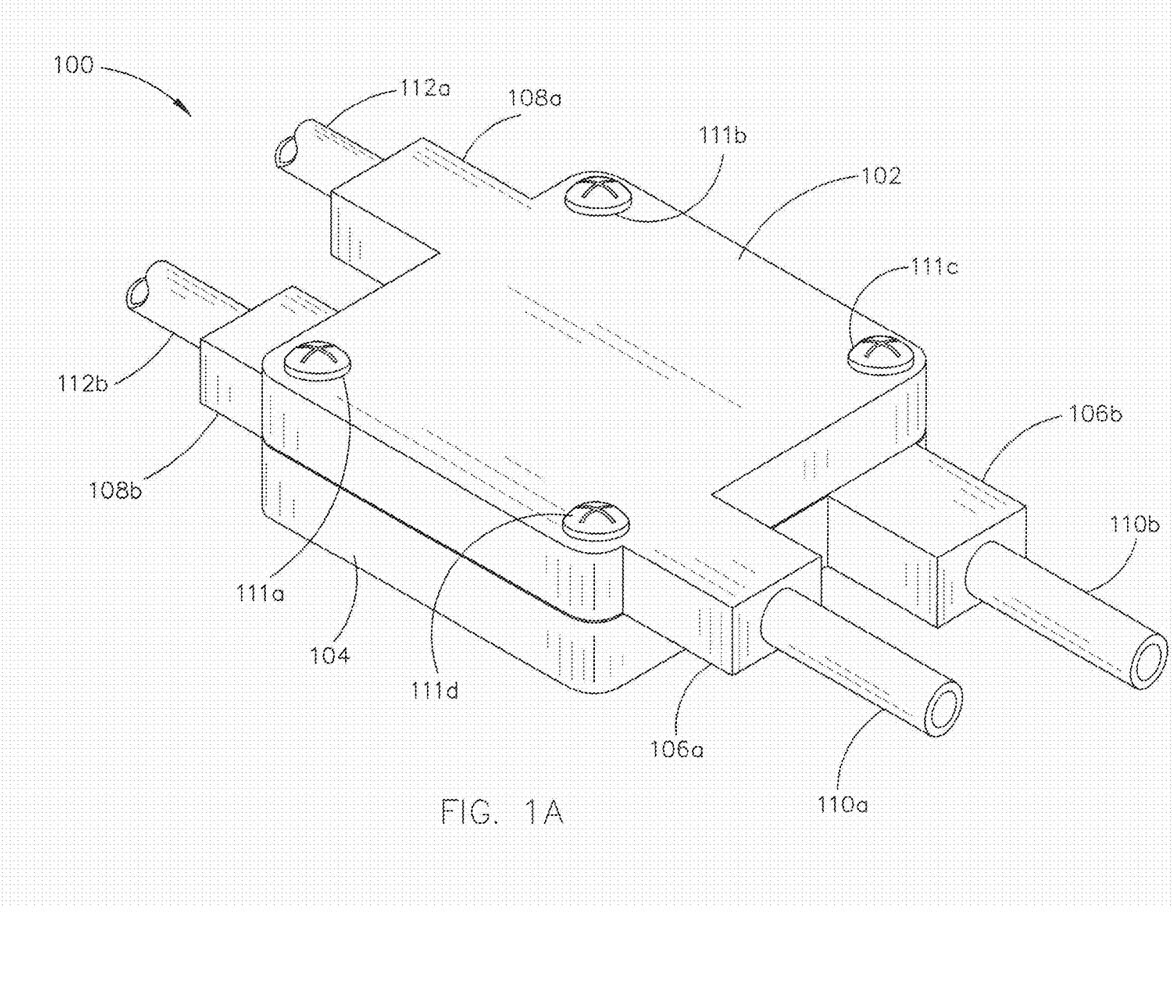
FIG. 1A illustrates an isometric view of a peristaltic pulse dampener, in accordance with one or more embodiments of the present disclosure.

FIG. 1A illustrates an isometric view of a peristaltic pulse dampener apparatus 100, in accordance with one or more embodiments of the present disclosure.

In one embodiment, apparatus 100 includes a chamber assembly defined by an upper chamber assembly 102 and a lower chamber assembly 104. In another embodiment, the upper chamber assembly 102 includes an upper input port 106a configured to receive an upper input line 110a, and an upper output port 108a configured to receive an upper output line 112a. Similarly, in another embodiment, the lower chamber assembly 104 includes a lower input port 106b configured to receive a lower input line 110b, and a lower output port 108b configured to receive a lower output line 112b.

Figure 7:
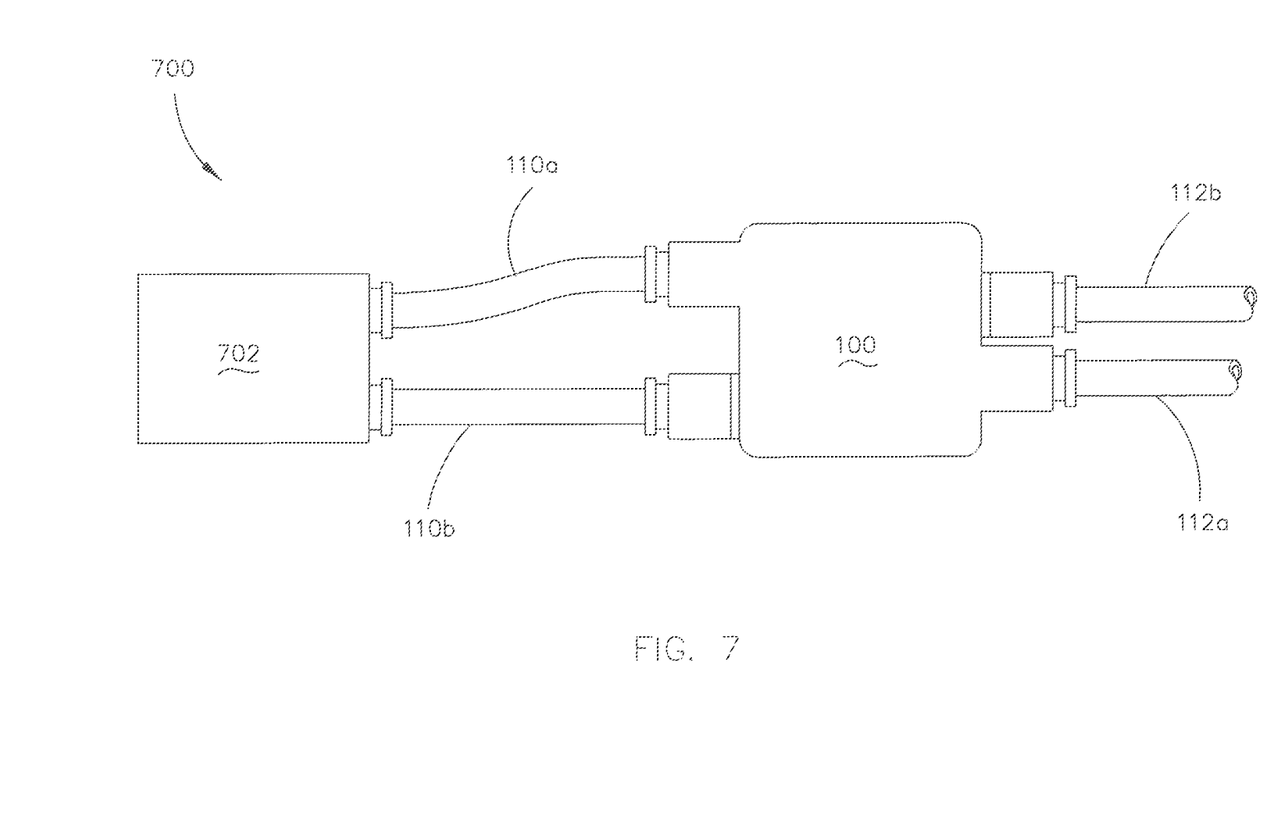
FIG. 7 illustrates a system including a peristaltic pump and a peristaltic pump dampener apparatus, in accordance with one or more embodiments of the present disclosure.

In one embodiment, apparatus 100 may be configured to receive two input flows via upper input line 110a and lower input line 110b, and generate two output flows via upper output line 112a and lower output line 112b. It is contemplated that the two input flows (e.g., upper input line 110a and lower input line 110b) may be received from one or more peristaltic pumps. In a preferred embodiment, the two input flows may be received from a single peristaltic pump that produces a pair of staggered sinusoidal output flows. For example, FIG. 7 illustrates a system 700 including a peristaltic pump 702 and a peristaltic pump dampener apparatus 100. As shown in FIG. 7, a peristaltic pump 702 may be configured to provide a first input flow to apparatus 100 via the upper input line 110a, and a second input flow to apparatus 100 via the lower input line 110b. After receiving one or more input flows, apparatus 100 may act to dampen the sinusoidal pumping pattern. In a preferred embodiment, apparatus 100 may dampen input flows substantially, thereby producing output flows (e.g., within upper output line 112a and lower output line 112b) exhibiting substantially steady, uniform flows.

In another embodiment, the upper chamber assembly 102 and the lower chamber assembly 104 are held together via bolts (e.g., first bolt 111a, second bolt 111b, third bolt 111c, and fourth bolt 111d). It is noted herein that bolts 111a-111d may include any fastener means known in the art including, but not limited to, screws, bolts, pins, and the like. Furthermore, although apparatus 100 depicted in FIGS. 1A-5B exhibits four separate bolts 111a-111d, this is not to be interpreted as a limitation of the present disclosure. In this regard, it is contemplated that apparatus 100 may include any number of bolts 111a-111d without departing from the spirit or scope of the present disclosure.

Figure 1B:
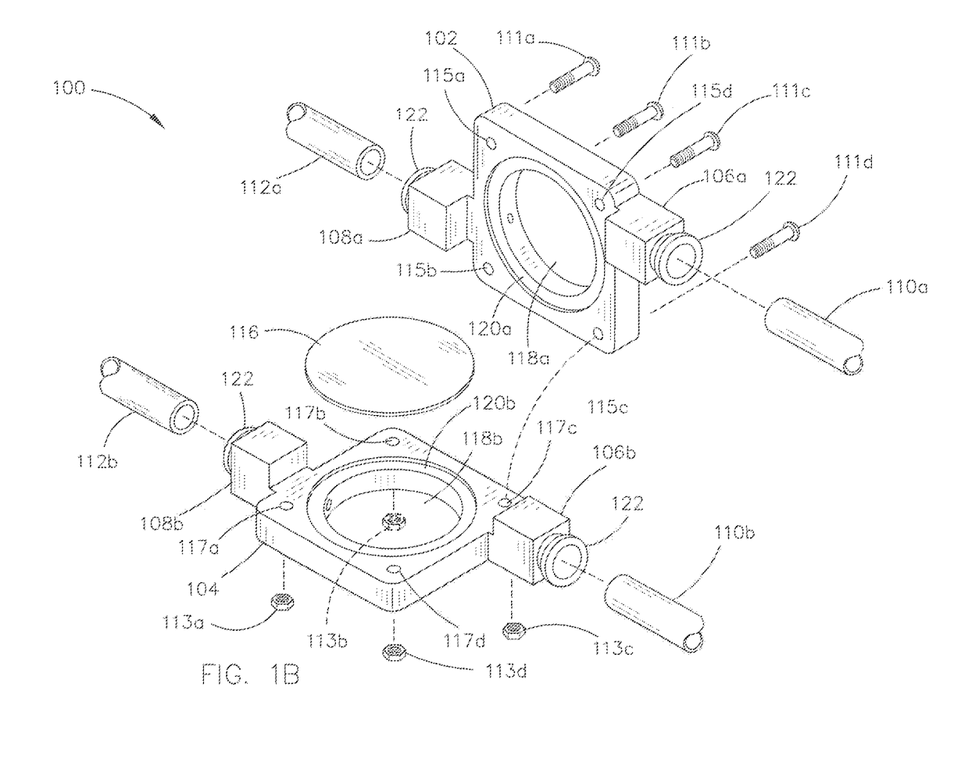
FIG. 1B illustrates an exploded isometric view of a peristaltic pulse dampener, in accordance with one or more embodiments of the present disclosure.

FIG. 1B illustrates an exploded isometric view of a peristaltic pulse dampener apparatus 100, in accordance with one or more embodiments of the present disclosure.

As noted previously herein, apparatus 100 may include a chamber assembly (e.g., body) defined by an upper chamber assembly 102 and a lower chamber assembly 104. Upper chamber assembly 102 may include an upper input port 106a and an upper output port 108a. Lower chamber assembly 104 may include a lower input port 106b and a lower output port 108b. In another embodiment, upper chamber assembly 102 includes one or more holes 115a, 115b, 115c, 115d configured to receive bolts 111a-111d. Lower chamber assembly 104 may include one or more holes 117a-117d which correspond to holes 115a-115d and which are configured to receive bolts 111a-111d. In this regard, it is contemplated that bolts 111a-111d may be placed within upper chamber assembly 102 via holes 115a-115d and may extend through lower chamber assembly 104 via holes 117a-117d. In one embodiment, one or more fasteners 113a, 113b, 113c, 113d may be configured to attach to bolts 111a-111d in order to securely fasten the upper chamber assembly 102 and the lower chamber assembly 104 together.

It is noted herein that apparatus 100 is not limited to the bolt 111a-111d and fastener 113a-113d configuration depicted. In this regard, it is contemplated that the upper chamber assembly 102 and the lower chamber assembly 104 may be secured together in any manner known in the art without departing from the spirit and scope of the present disclosure. For example, apparatus 100 may include, but is not limited to including, screws, nuts/bolts, pins, clamps, adhesives, snaps, and the like.

In one embodiment, the upper chamber assembly 102 and the lower chamber assembly 104 together define a cavity 118. For example, upper chamber assembly 102 may include an upper chamber 118a, and lower chamber assembly 104 may include a lower chamber 118b. In this regard, upper chamber 118a and lower chamber 118b may together define cavity 118. In one embodiment, upper chamber 118a and lower chamber 118b exhibit the same shape and/or size. For example, as shown in FIG. 1B, upper chamber 118a and lower chamber 118b may both take on a substantially cylindrical shape such that the walls of the upper chamber 118a and lower chamber 118b align with one another. It is noted herein that cylindrical shaped chambers 118a, 118b avoid corners where build-up may occur within apparatus 100, and may allow apparatus 100 to be self-cleaning. However, it is also noted that the cavity 118 configuration depicted in FIG. 1B is not to be regarded as limiting, and that cavity 118 (e.g., upper chamber 118a and lower chamber 118b) may take on any shape and/or size without departing from the spirit and scope of the present disclosure including, but not limited to, cylindrical, elliptical, spherical, and the like.

In another embodiment, apparatus 100 includes a flexible diaphragm 116 disposed within the chamber assembly (e.g., body) of apparatus 100. In one embodiment, the flexible diaphragm 116 is secured between the upper chamber assembly 102 and the lower chamber assembly 104 such that the flexible diaphragm 116 divides the cavity 118 into the upper chamber 118a and the lower chamber 118b. In one embodiment, flexible diaphragm 116 may be disposed within the body of apparatus 100 such that it divides the cavity 118 substantially in half. For example, flexible diaphragm 116, as shown in FIG. 1B, may divide the cavity 118 such that upper chamber 118a and lower chamber 118b are substantially the same size. In another embodiment, the upper chamber assembly 102 includes an upper diaphragm bezel 120a configured to receive the flexible diaphragm 116. Similarly, in another embodiment, the lower chamber assembly 104 may include a lower diaphragm bezel 120b configured to receive the flexible diaphragm 116. It is contemplated that the upper diaphragm bezel 120a and the lower diaphragm bezel 120b may help secure the flexible diaphragm 116. It is further contemplated that the diaphragm bezels (e.g., 120a, 120b) may create a waterproof seal with the flexible diaphragm 116 such that fluid contained within the upper chamber 118a may not travel into lower chamber 118b, and vis versa.

In one embodiment, flexible diaphragm 116 may be configured to flex up and down within the cavity 118 depending on the relative pressures within upper chamber 118a and lower chamber 118b. For example, if the pressure within upper chamber 118a were to exceed the pressure in the lower chamber 118b, flexible diaphragm 116 may flex downwards into the lower chamber 118b. By way of another example, if the pressure within lower chamber 118b were to exceed the pressure in the upper chamber 118a, flexible diaphragm 116 may flex upwards into the upper chamber 118a. In this regard, it is contemplated that flexible diaphragm 116 may act to help equalize the pressure between the upper chamber 118a and the lower chamber 118b. It is further noted that flexible diaphragm 116 may be made of any flexible and/or pliable material known in the art including, but not limited to, synthetic rubber, silicon rubber, flexible plastic, and the like.

Figure 2A:
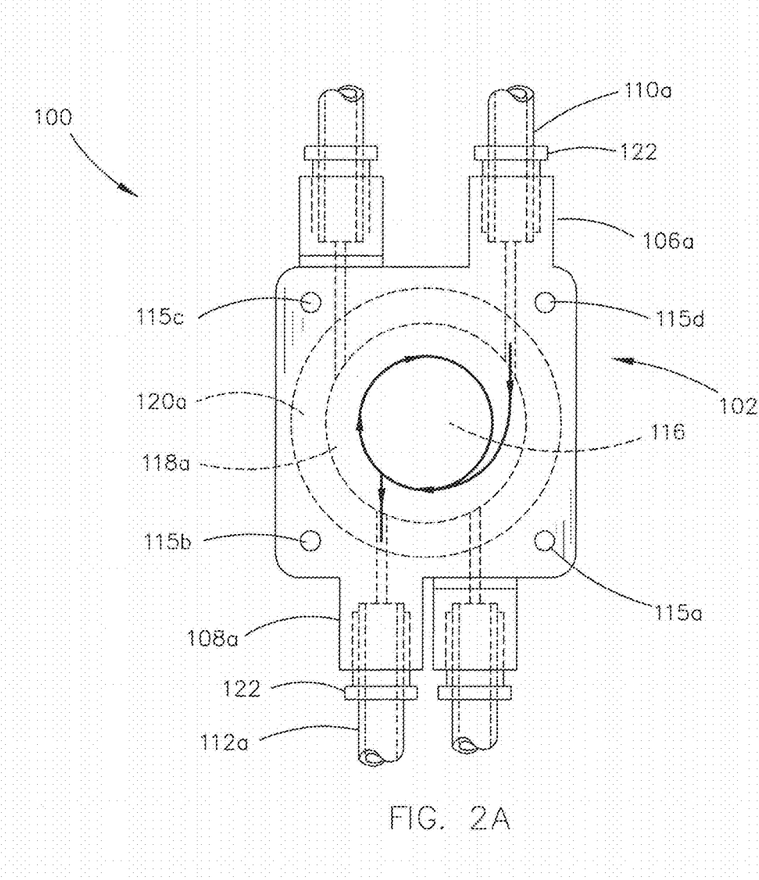
FIG. 2A illustrates top cross-sectional view of an upper chamber of a peristaltic pump dampener, in accordance with one or more embodiments of the present disclosure.

FIG. 2A illustrates a top cross-sectional view of an upper chamber 118a of a peristaltic pump dampener apparatus 100, in accordance with one or more embodiments of the present disclosure.

In one embodiment, the upper chamber 118a is substantially cylindrical in shape, wherein one end and the walls of the upper chamber 118a are defined by the upper chamber assembly 102, and the opposite end of the chamber 118a is defined by the flexible diaphragm 116. In another embodiment, the upper chamber 118a may be configured to receive a stream of fluid. In one embodiment, fluid may flow through upper input line 110a, through upper input port 106a, into upper chamber 118a, through upper output port 108a, and out upper output line 112a.

As noted previously herein, the fluid entering upper chamber 118a via upper input line 110a may come from a peristaltic pump and exhibit a sinusoidal pumping pattern. In one embodiment, upper input port 106a and upper input line 110a may be configured such that the fluid flow from the upper input line 110a is introduced into upper chamber 118a substantially tangent to the outer walls of the upper chamber 118a. In this regard, fluid flowing into the upper chamber 118a may flow in a substantially circular flow throughout the upper chamber 118a. For example, as depicted in FIG. 2A, upper input port 106a and upper input line 110a may introduce a flow of fluid tangent to the outer walls of upper chamber 118a such that fluid within upper chamber 118a flows in a substantially clockwise direction.

In another embodiment, an upper output port 108a and an upper output line 112a are disposed on the opposite side of apparatus 100 as the upper input port 106a and upper input line 110a. In another embodiment, upper output port 108a and upper output line 112a are configured to receive an output stream of fluid from the upper chamber 118a. In one embodiment, upper output port 108a and upper output line 112a are positioned approximately perpendicular to the walls of the upper chamber 118a. For example, as depicted in FIG. 2A, whereas fluid enters the upper chamber 118a substantially tangent to the walls of the upper chamber 118a, fluid leaves the upper chamber 118a via upper output port 108a approximately perpendicular to the walls of the upper chamber 118a.

Figure 2B:
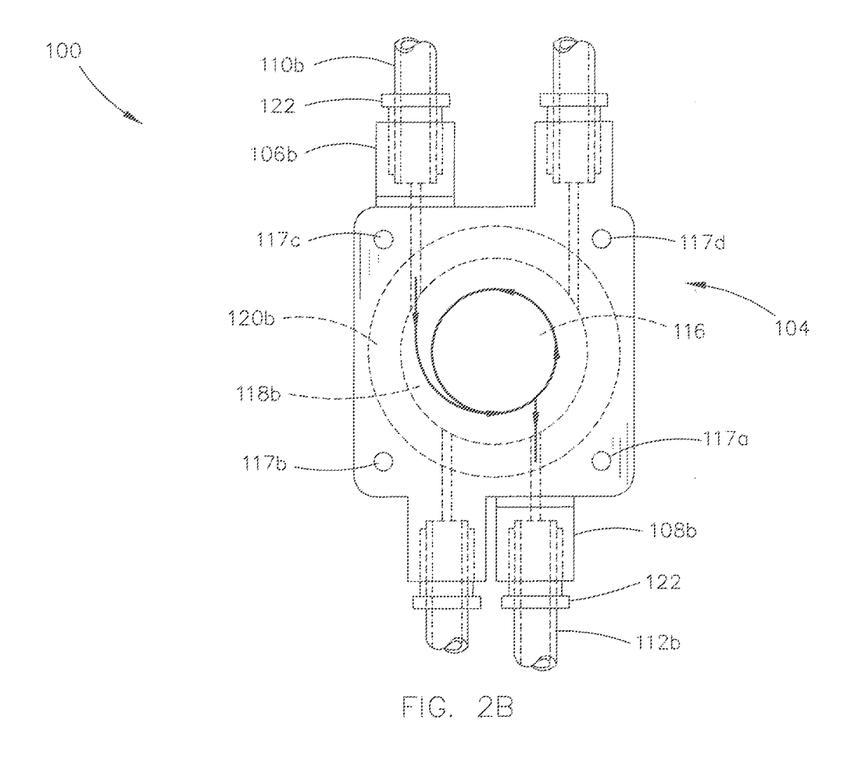
FIG. 2B illustrates top cross-sectional view of a lower chamber of a peristaltic pump dampener, in accordance with one or more embodiments of the present disclosure.

FIG. 2B illustrates a top cross-sectional view of a lower chamber 118b of a peristaltic pump dampener apparatus 100, in accordance with one or more embodiments of the present disclosure.

In one embodiment, the lower chamber 118b is substantially cylindrical in shape, wherein one end and the walls of the lower chamber 118b are defined by the lower chamber assembly 104, and the opposite end of the lower chamber 118b is defined by the flexible diaphragm 116. In another embodiment, the lower chamber 118b may be configured to receive a stream of fluid. In one embodiment, fluid may flow through lower input line 110b, through lower input port 106b, into lower chamber 118b, through lower output port 108b, and out lower output line 112b.

As noted previously herein, the fluid entering lower chamber 118b via lower input line 110b may come from a peristaltic pump and exhibit a sinusoidal pumping pattern. In one embodiment, lower input port 106b and lower input line 110b may be configured such that the fluid flow from the lower input line 110b is introduced into lower chamber 118b substantially tangent to the outer walls of the lower chamber 118b. In this regard, fluid flowing into the lower chamber 118b may flow in a substantially circular flow throughout the lower chamber 118b. For example, as depicted in FIG. 2B, lower input port 106b and lower input line 110b may introduce a flow of fluid tangent to the outer walls of lower chamber 118b such that fluid within lower chamber 118b flows in a substantially counterclockwise direction.

In another embodiment, a lower output port 108b and a lower output line 112b are disposed on the opposite side of apparatus 100 as the lower input port 106b and upper input line 110b. In another embodiment, lower output port 108b and lower output line 112b are configured to receive an output stream of fluid from the lower chamber 118b. In one embodiment, lower output port 108b and lower output line 112b are positioned approximately perpendicular to the walls of the lower chamber 118b. For example, as depicted in FIG. 2B, whereas fluid enters the lower chamber 118b substantially tangent to the walls of the lower chamber 118b, fluid leaves the lower chamber 118b via lower output port 108b approximately perpendicular to the walls of the lower chamber 118b.

Comparing FIGS. 2A and 2B, in one embodiment, the circular flows of fluid within the upper chamber 118a and the lower chamber 118b are in substantially opposite directions. For example, as depicted in FIGS. 2A and 2B, the flow in the upper chamber 118a may be in a substantially clockwise direction, whereas the flow in the lower chamber 118b may be in a substantially counter-clockwise direction. It is noted that the relative directions of circular flow within the upper chamber 118a and the lower chamber 118b are not to be regarded as limiting. For example, the flow in the upper chamber 118a may instead be substantially counter-clockwise, and the flow in the lower chamber 118b may instead be substantially clockwise.

As noted previously herein, the flow of fluid into the upper chamber 118a and lower chamber 118b via upper input line 110a and lower input line 110b, respectively, may exhibit substantially sinusoidal pumping patterns. Sinusoidal pumping patterns may be characterized by alternating high pressure and low pressure pumping periods. The sinusoidal pumping patterns within the input lines 110a, 110b may be the result of the input lines 110a, 110b coming from one or more peristaltic pumps. Alternatively, the sinusoidal pumping patterns within the input lines 110a, 110b may be the result of a single peristaltic pump with dual outputs (e.g., peristaltic pump with two output lines, which become the input lines 110a, 110b to apparatus 100). In a preferred embodiment, apparatus 100 is used in conjunction with a peristaltic pump that has a pair of staggered sinusoidal output flows. For example, a peristaltic pump to be used with apparatus 100 may include a pump with two series of staggered curves that occlude flexible tubes at points of tangent between the curves of the pump in a moving sequence. It is contemplated that this pump configuration may create a pair of staggered sinusoidal flows in the output tubes of the peristaltic pump. A peristaltic pump with a series of staggered curves used to generate a pair of staggered sinusoidal flows is general described by Geschwender in U.S. Pat. No. 8,366,420 B1, issued on Feb. 5, 2013, which is incorporated herein by reference in the entirety.

In a preferred embodiment, the sinusoidal flow entering the upper chamber 118a and the sinusoidal flow entering the lower chamber 118b are out of phase with each other. For example, as the upper input line 110a and the lower input line 110b direct fluid exhibiting a sinusoidal pumping pattern into the upper chamber 118a and the lower chamber 118b, respectively, the high pressure time periods of the flow in the upper input line 110a may correspond to low pressure time periods of the flow in the lower input line 110b. In this embodiment, out-of-phase input flows entering the upper chamber 118a and the lower chamber 118b in opposite directions may cause deviations in pressure between the two chambers (e.g., upper chamber 118a and lower chamber 118b) to move to the center of the cavity 118 (e.g., the center of the flexible diaphragm 116). When the pressure is low on one side of the flexible diaphragm 116, it is offset by high pressure on the other side of the flexible diaphragm 116. In this regard, by separating flows of opposite directions with out-of-phase pulsating flows, the flexible diaphragm 116 flexes up and down within the cavity 118 to maintain uniform pressure between the upper chamber 118a and the lower chamber 118b. In this embodiment, by maintaining substantially uniform pressure between the upper chamber 118a and the lower chamber 118b, apparatus 100 is able to produce substantially even, constant, and uniform output flows via upper output line 112a and lower output line 112b.

In one embodiment, the volume of the upper chamber 118a and the volume of the lower chamber 118b are larger than the staggered pulse volumes of the input flows (e.g., input flows from upper input line 110a and lower input line 110b). It is noted that chamber volumes (e.g., upper chamber 118a, lower chamber 118b) which are larger than the staggered pulse volumes of the input flows may help minimize the deflection of the flexible diaphragm 116 between the upper chamber 118a and the lower chamber 118b, thereby acting to balance the pressures of the chambers and create smooth, uniform output flows. In a preferred embodiment, the volume of the upper chamber 118a and the volume of the lower chamber 118b are multiples of the pulse volumes of the input flows (e.g., input flows from upper input line 110a and lower input line 110b). For example, the upper chamber 118a and the lower chamber 118b may have volumes which are sufficient to contain the volumes of eight pulses of the input flows. By way of another example, the upper chamber 118a and the lower chamber 118b may have volumes which are sufficient to contain the volumes of sixteen pulses of the input flows. By way of another example, the upper chamber 118a and the lower chamber 118b may have volumes which are sufficient to contain the volumes of thirty-two pulses of the input flows. It is noted herein that chambers (e.g., chambers 118a, 118b) which are able to contain larger volumes (e.g., more input flow pulse volumes) may require the flexible diaphragm 116 to flex less in order to maintain the pressure between the chambers 118a, 118b, and may therefore result in more efficient pulse dampening. It is further noted, however, that the examples provided are solely by way of illustration, and that the examples provided are not to be regarded as limiting. In this regard, it is contemplated that chambers 118a, 118b may be constructed with any volume and configured to contain any number of input flow pulse volumes without departing from the spirit and scope of the present disclosure.

Figure 3:
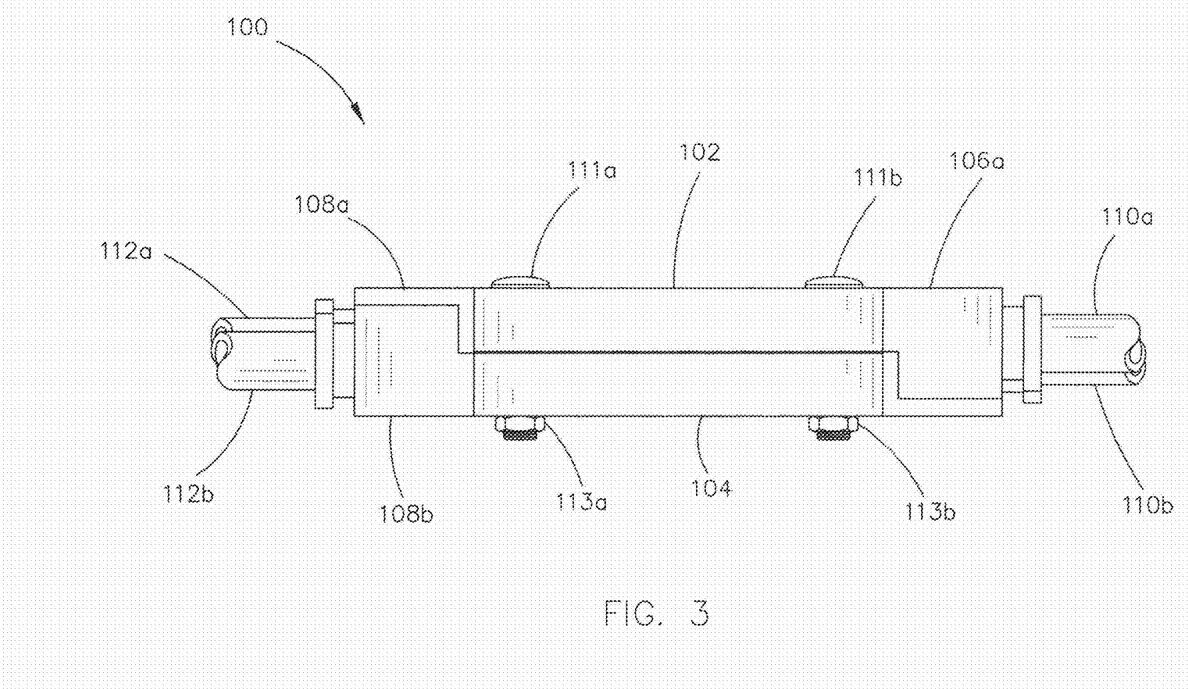
FIG. 3 illustrates a side view of a peristaltic pulse dampener, in accordance with one or more embodiments of the present disclosure.

FIG. 3 illustrates a side view of a peristaltic pulse dampener apparatus 100, in accordance with one or more embodiments of the present disclosure. As shown in FIG. 3, apparatus 100 may include an upper chamber assembly 102 and a lower chamber assembly 104 attached via one or more bolts 111a, 111b and one or more fasteners 113a, 113b. In another embodiment, upper chamber assembly 102 may include an upper input line 110a, an upper input port 106a, an upper output port 108a, and an upper output line 112a. Similarly, in another embodiment, lower chamber assembly 104 may include a lower input line 110b, a lower input port 106b, a lower output port 108b, and a lower output line 112b.

Figure 4A:
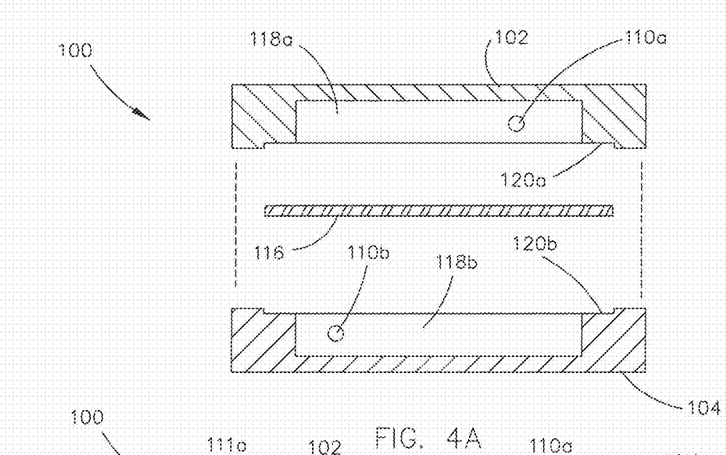
FIG. 4A illustrates an exploded side cross-sectional view of a peristaltic pulse dampener, in accordance with one or more embodiments of the present disclosure.

FIG. 4A illustrates an exploded side cross-section view of a peristaltic pulse dampener apparatus 100, in accordance with one or more embodiments of the present disclosure. In one embodiment, apparatus 100 includes an upper chamber assembly 102, a flexible diaphragm 116, and a lower chamber assembly 104.

In one embodiment, the flexible diaphragm 116 is disposed within the cavity 118 defined by the upper chamber assembly 102 and the lower chamber assembly 104 via upper diaphragm bezel 120a and lower diaphragm bezel 120b. In another embodiment, flexible diaphragm 116 is disposed within cavity 118 such that the flexible diaphragm 116 divides the cavity 118 into an upper chamber 118a and a lower chamber 118b. In a preferred embodiment, the flexible diaphragm 116 divides cavity 118 such that upper chamber 118a and lower chamber 118b are substantially the same size.

In another embodiment, upper input line 110a allows fluid to flow from the upper input line 110a into the upper chamber 118a tangent to the walls of the upper chamber 118a. Similarly, in another embodiment, lower input line 110b allows fluid to flow from the lower input line 110b into the lower chamber 118b tangent to the walls of the lower chamber 118b.

Figure 4B:
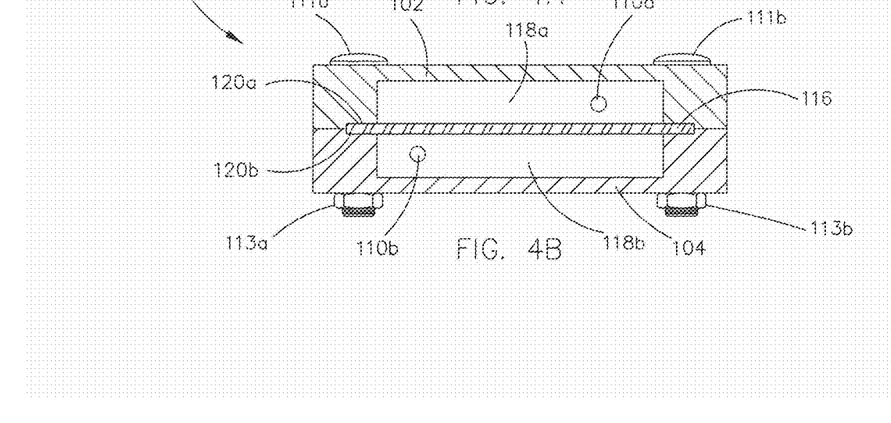
FIG. 4B illustrates a side cross-sectional view of a peristaltic pulse dampener, in accordance with one or more embodiments of the present disclosure.

FIG. 4B illustrates a side cross-sectional view of a peristaltic pulse dampener apparatus 100, in accordance with one or more embodiments of the present disclosure. In one embodiment, the body of apparatus 100 is made up of an upper chamber assembly 102 and a lower chamber assembly 104. In another embodiment, the upper chamber assembly 102 and the lower chamber assembly 104 are secured together via one or more bolts 111a, 111b and one or more fasteners 113a, 113b.

Figure 5A:
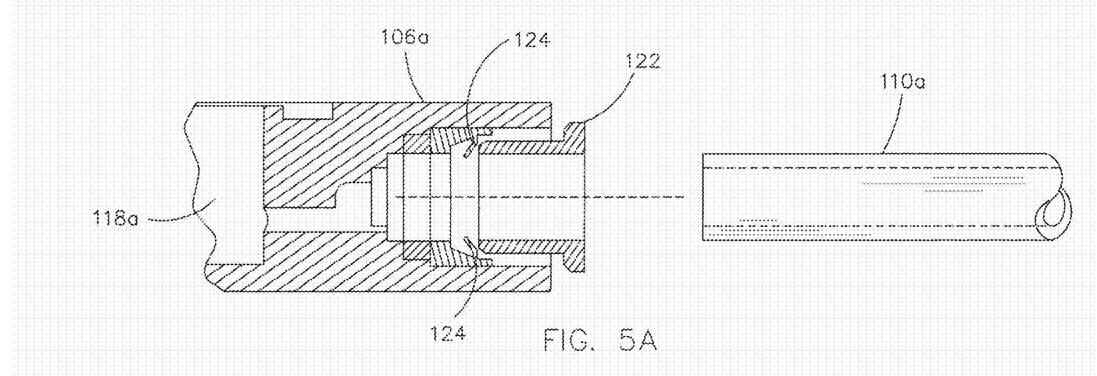
FIG. 5A illustrates an exploded partial side cross-sectional view of an input/output port of a peristaltic pulse dampener, in accordance with one or more embodiments of the present disclosure.

FIG. 5A illustrates an exploded partial side cross-sectional view of an upper input/output port of a peristaltic pulse dampener apparatus 100, in accordance with one or more embodiments of the present disclosure. Similarly, FIG. 5B illustrates a partial side cross-sectional view of an upper input/output port of a peristaltic pulse dampener apparatus 100, in accordance with one or more embodiments of the present disclosure.

For the sake of simplicity and to most effectively describe the inventive concepts of the present disclosure, FIGS. 5A and 5B will be described as referring to upper input line 110a and upper input port 106a. However, this is not to be regarded as a limitation of the present disclosure. In this regard, FIGS. 5A and 5B and their associated description may be regarded as applying to all the input lines, input ports, output lines, and output ports of the present disclosure, unless noted otherwise herein. For example, FIGS. 5A and 5B and the associated description may be regarded as applying to upper input line 110a, lower input line 110b, upper input port 106a, lower input port 106b, upper output line 112a, lower input line 112b, upper output port 108a, and lower output port 108b, unless noted otherwise herein.

Figure 5B:
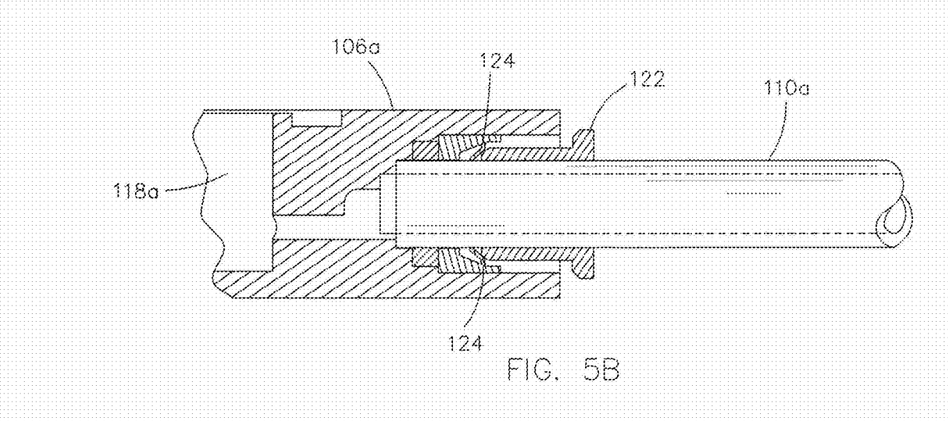
FIG. 5B illustrates a partial side cross-sectional view of an input/output port of a peristaltic pulse dampener, in accordance with one or more embodiments of the present disclosure.

As depicted in FIGS. 5A and 5B, upper input line 110a may be configured to be disposed within the upper input port 106a. It is noted herein that the upper input line 110a may be made of any material known in the art. It is further noted that, due to the fact that input flows (e.g., input flows to upper input line 110a and lower input line 110b) come from one or more peristaltic pumps, the input lines 110a, 110b may preferentially be made of a material which is compatible for use in peristaltic pumps.

In another embodiment, the upper input port 106a may optionally include a cartridge 122 configured to receive the upper input line 110a. In another embodiment, cartridge 122 may include a seal 124 configured to prevent fluid from escaping the upper input port 106a. For example, as shown in FIG. 5A, the seal 124 may extend from the walls of the cartridge 122 when in an "unengaged" position. Conversely, as depicted in FIG. 5B, when the upper input line 110 is inserted into the cartridge 122 (e.g., in an "engaged" position), the seal 124 may be depressed toward the walls of the cartridge 122, thereby preventing fluid from escaping the upper input port 106a. An example of an upper input port 106a which may be used in conjunction with the present disclosure is the LF 3100 Carstick Polymer Cartridge. However, it is noted herein that the present disclosure is not to be regarded as being limited to any particular input port 106, cartridge 122, and/or seal 124. In this regard, it is contemplated that any input port 106 which is capable of being coupled to the input line 110 may be used without departing from the spirit or scope of the present disclosure.

Figure 6:
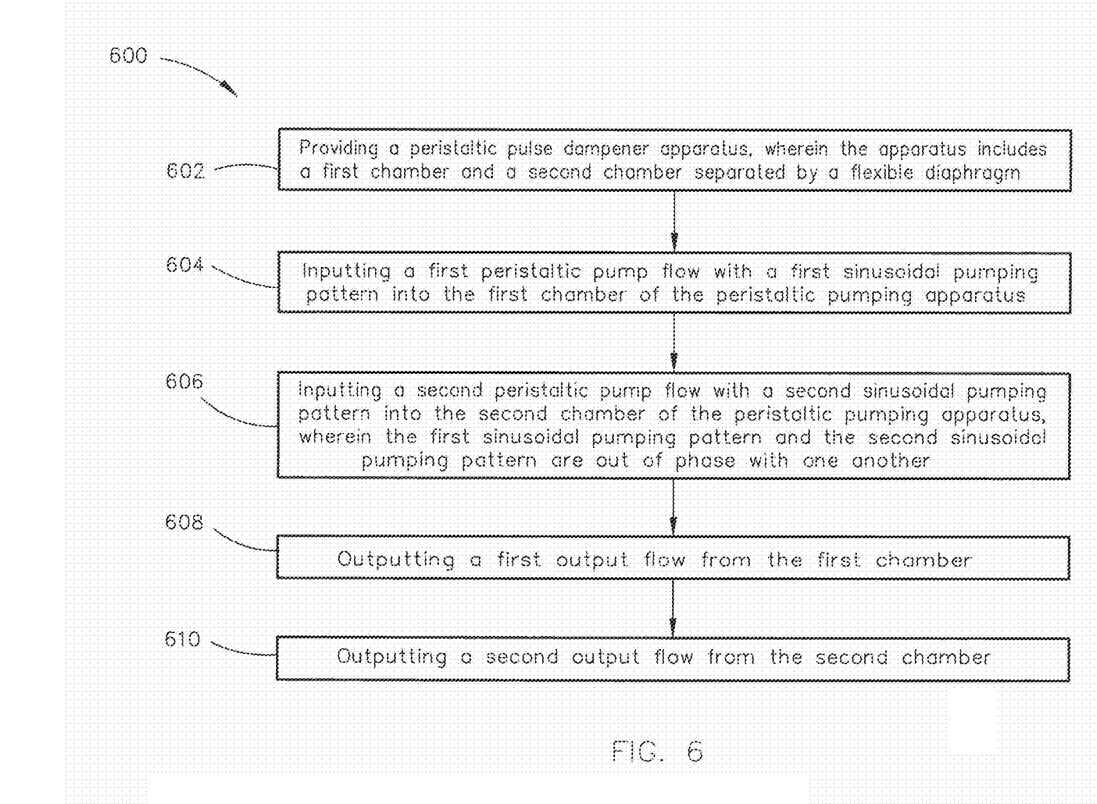
FIG. 6 illustrates a flow diagram of a method for dampening the pulse of a peristaltic pump, in accordance with one or more embodiments of the present disclosure.

FIG. 6 illustrates a flow diagram of a method 600 for dampening the pulse of a peristaltic pump, in accordance with one or more embodiments of the present disclosure. Applicant notes that the embodiments described previously herein in the context of apparatus 100 should be interpreted to extend to method 600. It is further noted, however, that the method 600 is not limited to the architecture of apparatus 100.

In step 602, a peristaltic pulse dampener apparatus is provided, wherein the apparatus includes a first chamber and a second chamber separated by a flexible diaphragm. By way of example, the peristaltic pulse dampener apparatus may include apparatus 100, as described herein.

In step 604, a first peristaltic pump flow with a first sinusoidal pumping pattern is input into the first chamber of the peristaltic pumping assembly. For example, a first peristaltic pump flow may be input into upper chamber 118a via upper input line 110a.

In step 604, a second peristaltic pump flow with a second sinusoidal pumping pattern is input into the second chamber of the peristaltic pulse dampener apparatus, wherein the first sinusoidal pumping pattern and the second sinusoidal pumping pattern are out of phase with one another. For example, a second peristaltic pump flow may be input into lower chamber 118b via lower input line 110b. By way of another example, the high pressure time periods of the first peristaltic pump flow may correspond to low pressure time periods of the second peristaltic pump flow.

In step 608, a first output flow is output from the first chamber. In step 610, a second output flow is output from the second chamber. For example, a first output flow may exit the upper chamber 118a via upper output line 112a. By way of another example, a second output flow may exit the lower chamber 118b via lower output line 112b. In one embodiment, the flexible diaphragm 116 may act to equalize the pressure between the upper chamber 118a and the lower chamber 118b, thereby resulting in substantially even, continuous output flows (e.g., first output flow and second output flow).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is described herein as a single figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to,"

"related to," or other past-tense adjectives are generally not intended to exclude such variants, unless context dictates otherwise.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed:

1. An apparatus comprising:
a chamber assembly, wherein the chamber assembly defines an open cavity;
a flexible diaphragm disposed within the chamber assembly, wherein the flexible diaphragm divides the open cavity into a first chamber and a second chamber;
a first input line configured to receive a first input flow and direct first input flow into the first chamber tangent to a wall of the first chamber, and a first output line configured to receive a first output flow and direct the first output flow out of the first chamber; and
a second input line configured to receive a second input flow and direct the second output flow into the second chamber tangent to a wall of the second chamber, and a second output line configured to receive a second output flow and direct the second output flow out of the second chamber;
wherein the first input flow and the second input flow exhibit sinusoidal pumping patterns which are out of phase with one another.

2. The apparatus of claim 1, wherein the first chamber and the second chamber are substantially the same size and shape.

3. The apparatus of claim 2, wherein the first chamber and the second chamber are substantially cylindrical.

4. The apparatus of claim 1, wherein the first input flow circulates the first chamber in a substantially clockwise manner, and wherein the second input flow circulates the second chamber in a substantially counter-clockwise manner.

5. The apparatus of claim 1, wherein the first input flow circulates the first chamber in a substantially counter-clockwise manner, and wherein the second input flow circulates the second chamber in a substantially clockwise manner.

6. The apparatus of claim 1, wherein the first output flow and the second output flow exhibit substantially constant flows.

7. The apparatus of claim 1, wherein the flexible diaphragm is configured to flex in order to equalize pressure in the first chamber and the pressure in the second chamber.

8. The apparatus of claim 1, wherein the first chamber has a volume which is a multiple of the volume of a pulse of the first sinusoidal input flow, and wherein the second chamber has a volume which is a multiple of the volume of a pulse of the second sinusoidal input flow.

9. The apparatus of claim 1, wherein the first input flow and the second input flow come from a single peristaltic pump.

10. A method, comprising:
providing a peristaltic pulse dampener apparatus, wherein the apparatus includes a first chamber and a second chamber separated by a flexible diaphragm;
inputting a first peristaltic pump flow with a first sinusoidal pumping pattern into the first chamber of the peristaltic pulse dampener apparatus tangent to a wall of the first chamber;
inputting a second peristaltic pump flow with a second sinusoidal pumping pattern into the second chamber of the peristaltic pulse dampener apparatus tangent to a wall of the second chamber, wherein the first sinusoidal pumping pattern and the second sinusoidal pumping pattern are out of phase with one another;
outputting a first output flow from the first chamber; and
outputting a second output flow from the second chamber.

11. The method of claim 10, wherein the first chamber and the second chamber are substantially the same size and shape.

12. The method of claim 11, wherein the first chamber and the second chamber are substantially cylindrical.

13. The method of claim 10, wherein the first peristaltic pump flow circulates the first chamber in a substantially clockwise manner, and wherein the second peristaltic pump flow circulates the second chamber in a substantially counter-clockwise manner.

14. The method of claim 10, wherein the first peristaltic pump flow circulates the first chamber in a substantially counter-clockwise manner, and wherein the second peristaltic pump flow circulates the second chamber in a substantially clockwise manner.

15. The method of claim 10, wherein the first output flow and the second output flow exhibit substantially constant flows.

16. The method of claim 10, wherein the flexible diaphragm is configured to flex in order to equalize pressure in the first chamber and the pressure in the second chamber.

17. The method of claim 10, wherein the first chamber has a volume which is a multiple of the volume of a pulse of the first sinusoidal input flow, and wherein the second chamber has a volume which is a multiple of the volume of a pulse of the second sinusoidal input flow.

18. A system, comprising:
a peristaltic pump; and
a peristaltic pump dampener apparatus, wherein the peristaltic pump dampener apparatus includes:
a chamber assembly, wherein the chamber assembly defines an open cavity;
a flexible diaphragm disposed within the chamber assembly, wherein the flexible diaphragm divides the open cavity into a first chamber and a second chamber;
a first input line configured to receive a first input flow from the peristaltic pump and direct the first input flow into the first chamber tangent to a wall of the first chamber, and a first output line configured to receive a first output flow and allow the first output flow to exit the first chamber; and
a second input line configured to receive a second input flow from the peristaltic pump and direct the second input flow into the second chamber tangent to a wall of the second chamber, and a second output line configured to receive a second output flow and direct the second output flow out of the second chamber;
wherein the first input flow and the second input flow exhibit sinusoidal pumping patterns which are out of phase with one another.

* * * * *